US006668855B2

(12) United States Patent
Heald et al.

(10) Patent No.: US 6,668,855 B2
(45) Date of Patent: Dec. 30, 2003

(54) DIRECT-ACTING PRESSURE REGULATOR

(75) Inventors: Paul W. Heald, San Marcos, TX (US); Christopher G. Turney, The Woodlands, TX (US); Loftus A. Fitzwater, III, Sugarland, TX (US); Mark E. Hood, New Braunfels, TX (US); Charles M. Olds, Martindale, TX (US)

(73) Assignee: S. H. Leggitt Company, San Marcos, TX (US)

( * ) Notice: Subject to any disclaimer, the term of this patent is extended or adjusted under 35 U.S.C. 154(b) by 0 days.

(21) Appl. No.: 09/898,571

(22) Filed: Jul. 3, 2001

(65) Prior Publication Data

US 2002/0066485 A1 Jun. 6, 2002

Related U.S. Application Data

(60) Provisional application No. 60/216,533, filed on Jul. 7, 2000.

(51) Int. Cl.[7] .............................................. G05D 16/06
(52) U.S. Cl. .............................. 137/505.26; 137/505.44
(58) Field of Search ........................ 137/505.26, 495, 137/505.29, 505.35, 505.44, 505.45, 505.36

(56) References Cited

U.S. PATENT DOCUMENTS

| 324,160 | A | | 8/1885 | Phillippi |
|---|---|---|---|---|
| 1,166,358 | A | | 12/1915 | Grant |
| 1,597,863 | A | * | 8/1926 | Olin ....................... 137/505.37 |
| 2,737,201 | A | | 3/1956 | St. Clair et al. |
| 2,737,202 | A | | 3/1956 | Baldwin, Jr. et al. |
| 2,781,776 | A | | 2/1957 | Gratzmuller |
| 2,826,214 | A | | 3/1958 | Volker |
| 3,003,519 | A | | 10/1961 | Homeyer et al. |
| 3,089,510 | A | | 5/1963 | Lum |
| 3,139,898 | A | | 7/1964 | Wiltgen et al. |
| 3,326,510 | A | | 6/1967 | Kolze |
| 3,664,369 | A | | 5/1972 | Johnson |
| 3,777,777 | A | | 12/1973 | Katchka |
| 3,795,258 | A | * | 3/1974 | lung ....................... 137/505.35 |
| 3,812,877 | A | * | 5/1974 | Fleischhacker et al. .. 137/116.5 |
| 3,980,273 | A | | 9/1976 | Turner et al. |
| 4,275,764 | A | | 6/1981 | Baret |
| 4,450,858 | A | * | 5/1984 | Acomb .................... 137/484.8 |
| 4,481,971 | A | | 11/1984 | Farrell et al. |
| 4,576,195 | A | | 3/1986 | Dreibelbis |
| 4,635,537 | A | | 1/1987 | Field |
| 5,131,425 | A | | 7/1992 | Sturgis |
| 5,501,247 | A | * | 3/1996 | Miller .................... 137/505.41 |
| 5,586,569 | A | * | 12/1996 | Hanning et al. ......... 137/116.5 |
| 5,829,477 | A | | 11/1998 | Graham et al. |
| 5,881,765 | A | | 3/1999 | Turney et al. |
| 5,996,617 | A | | 12/1999 | Olds et al. |
| 6,202,682 | B1 | | 3/2001 | Johnson |

FOREIGN PATENT DOCUMENTS

| EP | 0612005 | 8/1994 |
|---|---|---|
| FR | 2410194 | 6/1979 |

* cited by examiner

*Primary Examiner*—Stephen M. Hepperle
(74) *Attorney, Agent, or Firm*—Price, Heneveld, Cooper, DeWitt & Litton (57) ABSTRACT

A pressure regulator having a housing with an inlet port and an outlet port. A plug is located within the housing and dividing the housing into an upper chamber and a lower chamber, with the upper and lower chamber being connected by a vent. The plug includes a fluid path between the inlet port and the bore. A yoke is adapted selectively close the fluid path in the plug. A diaphragm is located in the upper chamber and is connected to the yoke. A biasing member biases the yoke to open the fluid path through the plug. The diaphragm is configured to move the yoke to open the fluid path when pressure in the lower chamber and vented to the upper chamber through the vent is above a predetermined amount. The pressure regulator can also include a second biasing member used to positively close the fluid path through the plug.

47 Claims, 4 Drawing Sheets

DIRECT-ACTING PRESSURE REGULATOR

CROSS-REFERENCE TO RELATED APPLICATION

The present invention claims priority to Provisional Patent Application Serial No. 60/216,533, filed on Jul. 7, 2000 entitled DIRECT-ACTING PRESSURE REGULATOR.

BACKGROUND AND GENERAL SUMMARY OF THE INVENTION

This invention is applicable to a wide range of gas pressure-regulating applications, but is designed for particularly advantageous use in propane outdoor cooking appliance applications.

Heretofore, the gas pressure output of a pressure regulator has been controlled by applying the inlet pressure against a flexible diaphragm surface area that is balanced with a spring force set at or adjusted to the desired output gas pressure. Most regulators using flexible diaphragms, however, have not had a direct-acting mechanism between the regulating valve and the diaphragm. Therefore, more parts are needed to control the flow of the gas, and regulation is often not as well controlled and accurate as desired. Also, the pressure regulators had to be large and expensive because of all of the elements needed to control the gas pressure. Furthermore, such pressure regulators typically require gas pressure in the outlet gas line to operate the regulating device and to shut off the flow of gas. If a positive shut off is required as a safety measure, a separate shut-off valve had to be placed at the outlet of the regulator to prevent the flow of gas downstream. Such a separate shut-off valve adds further expense.

Accordingly, an apparatus which avoids the aforementioned disadvantages and has the aforementioned desired features has long been desired.

OBJECTS OF THE INVENTION

Broadly stated, the principal objects of the invention include providing a new and novel type of gas pressure regulator particularly well-suited for use in propane outdoor cooking appliance applications and the like, different from the type customarily used heretofore in this field, having novel and advantageous structures and features which provide significantly improved results. A further object of the invention is to provide an enhanced-performance pressure regulator having novel and advantageous physical componentry which cooperatively provides substantially and uniquely improved results and enables use of very small inlet orifice diameter, small diaphragm diameter and small overall regulator size, providing for reduced costs as well as implementation advantages and improved operational results.

A still further and more particular object of the invention is to provide an improved pressure regulator valve having novel internal componentry. Another important object of the invention is to provide an enhanced-performance, low-cost regulator that lends itself effectively to the use of automated manufacturing equipment and provides for ease of assembly. A further object of the invention is to provide an enhanced-performance pressure regulator having novel and advantageous physical componentry which cooperatively provides substantially improved and uniquely advantageous physical results and enables use of a very small overall regulator size, providing for reduced costs as well as implementation advantages. Another object of the present invention is to provide a pre-assembly orifice plug and yoke component that can be installed into a pressure regulator body easily. Additional objects of the invention, as well as additional advantages thereof, will become apparent following consideration of the ensuing disclosure.

These and other features, advantages and objects of the present invention will be further understood and appreciated by those skilled in the art by reference to the following specification, claims and appended drawings.

BRIEF DESCRIPTION OF THE DRAWINGS

The following brief description of the figures, and the related figures themselves, exemplifies a particular preferred embodiment of the invention constituting the best mode presently contemplated. As will be understood, other embodiments of the invention as well as changes and variations in the particular structure shown in these figures are no doubt possible, and may very well suggest themselves to those skilled in the art after studying this disclosure and these figures.

DETAILED DESCRIPTION OF PREFERRED EMBODIMENT

Figure 1:
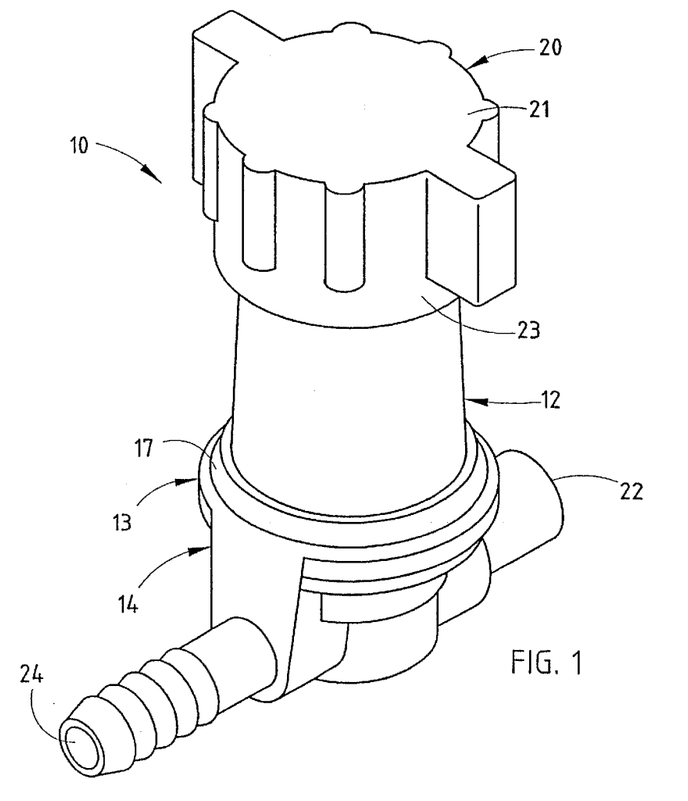
FIG. 1 is a perspective representation of an assembled pressure regulator in accordance with the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts generally defined in the appended brief statements of the invention. Hence, specific physical details and characteristics present in the embodiments disclosed herein are not to be considered as limiting, unless expressly stated otherwise.

Figure 2:
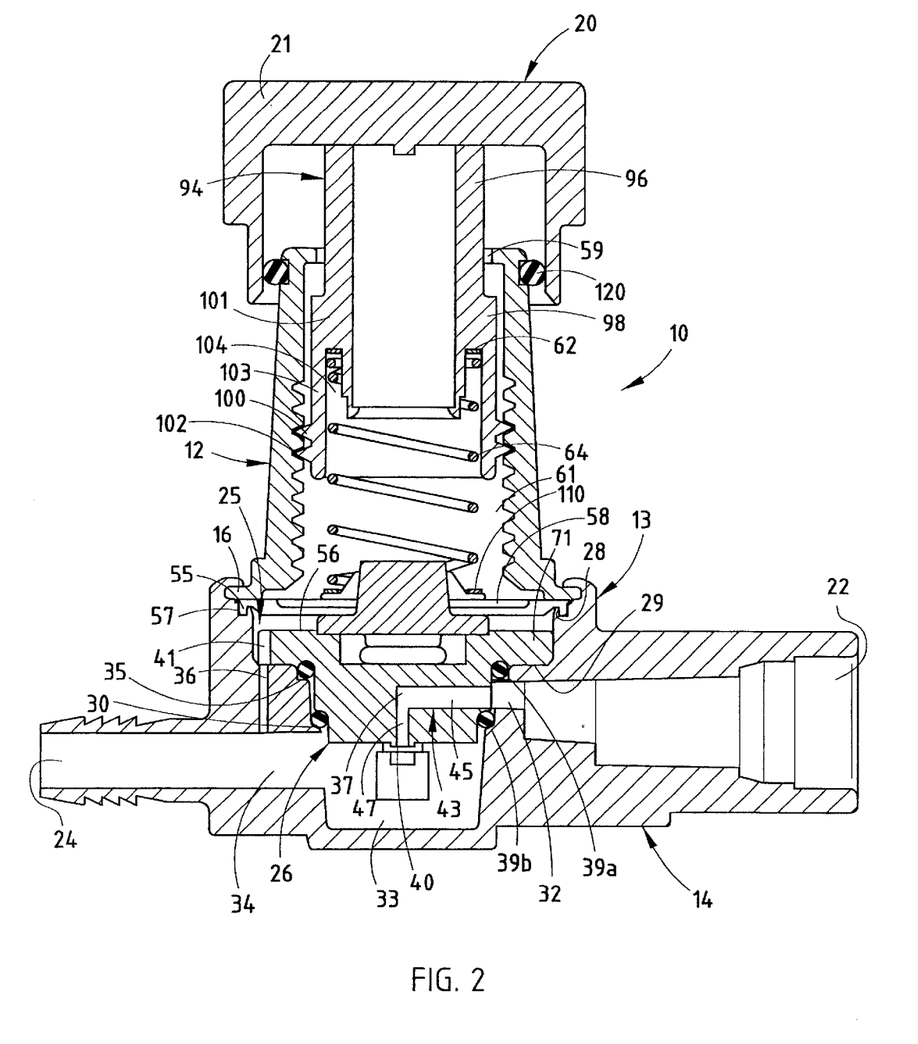
FIG. 2 is an enlarged cross-sectional side view of the pressure regulator in accordance with the invention.

The reference number 10 (FIG. 1) generally designates a pressure regulator embodying the present invention. In the illustrated example, pressure regulator 10 has a smaller upper body 12 (sometimes called the "bonnet") and a larger lower body 14. The upper body 12 and the lower body 14 may be substantially cylindrical. The lower body 14 is connected to the upper body 12 by mechanically deforming, or crimping, an upstanding flange 17 on the outside of the upper portion 13 of the lower body 14 over the outer flange 16 (FIG. 2) of the upper body 12. The crimp could also be reversed with a downward flange on the outside of the lower end of the upper body 12 and an outer flange on the lower body 14. Alternatively, the smaller upper body 12 can have an outer flange at a lower end, which connects to the upper portion 13 of lower body 14 by a plurality of threaded fasteners. Protruding from the top of upper body 12 is an adjustment cap 20 for the pressure regulator 10, the function of which is described below. The adjustment cap 20 has a top portion 21 and a downwardly depending skirt 23. The outer surface of lower body 14 has an inlet port 22 and an aligned outlet port 24 (FIGS. 1 and 2). In use, the inlet port 22 is connected to a source of fuel, e.g., gas (not shown), and the outlet port is connected to an outdoor cooking appliance (not shown).

Figure 3:
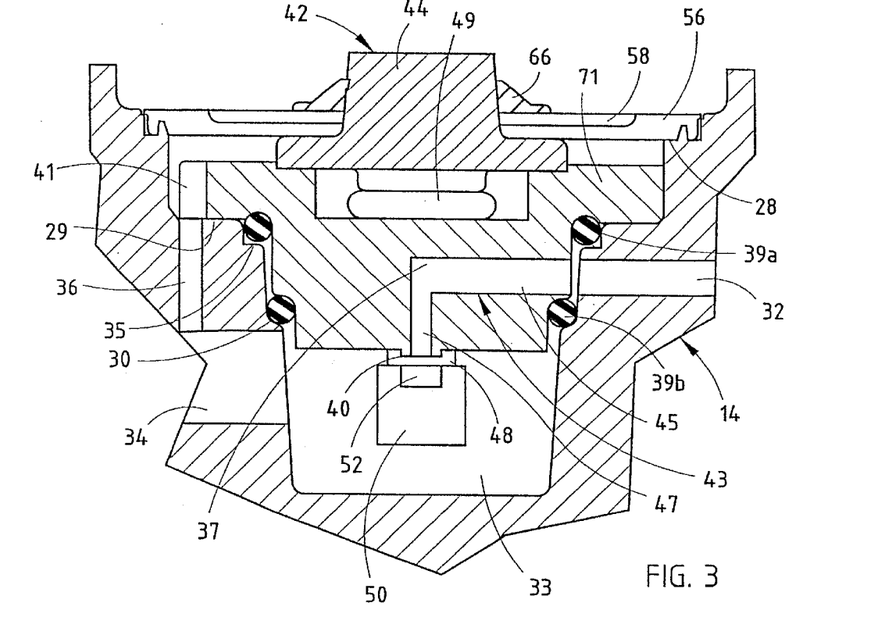
FIG. 3 is a further enlarged cross-sectional side view of the lower cylindrical body, orifice plug and yoke assembly in accordance with the present invention.
Figure 4:
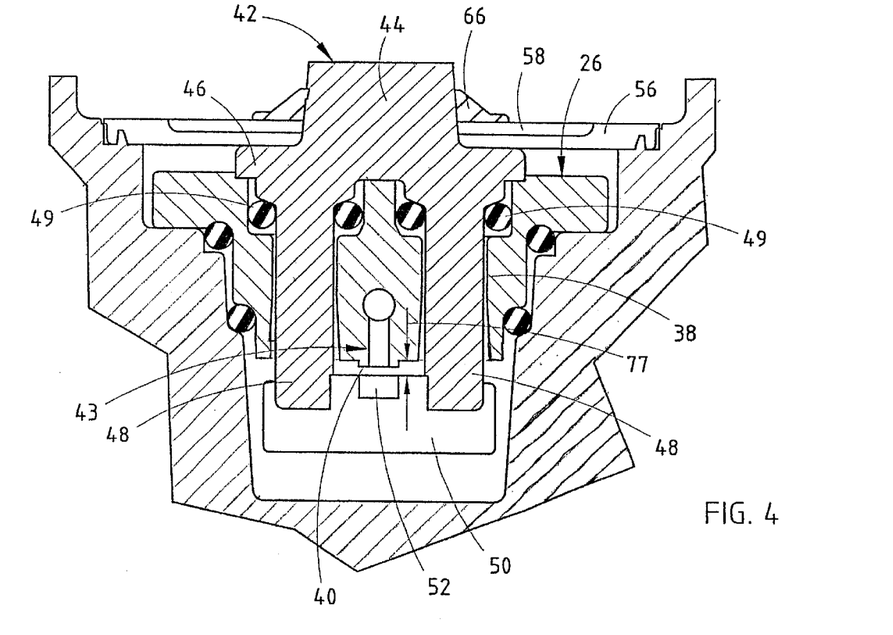
FIG. 4 is a similarly enlarged cross-sectional side view of the lower cylindrical body, orifice plug and yoke assembly rotated 90° from the position shown in FIG. 3.

Referring to FIGS. 2–4, the upper portion 13 of the lower body 14 has a stepped-diameter cylindrical recess or cavity 25 which opens through the top of lower body 14 and receives an orifice plug 26. The orifice plug cavity 25 communicates with the inlet port 22 through a small-diameter inlet channel 32, and communicates with the outlet port 24 through an outlet channel 34. The inlet channel 32 and the outlet channel 34 are aligned with the inlet port 22 and the outlet port 24, respectively. The illustrated orifice plug cavity 25 is made of five progressively smaller-diameter areas which form a first circular ledge 28 near the top of the lower body 14, a second circular ledge 29 below the first ledge 28, a third circular ledge 35 above inlet channel 32 and below the second ledge 29, a fourth circular ledge 30 below the inlet channel 32 but above the outlet channel 34 and a bottom 33 aligned with the outlet channel 34. The second ledge 29 supports the orifice plug 26 within cavity 25. Cavity 25 also has a secondary port 36 opening into the second ledge 29 and connecting the outlet port 24 to cavity 25.

The illustrated orifice plug 26 is of stepped cylindrical configuration, with three progressively smaller-diameter portions corresponding to the cavity 25 noted above. The orifice plug 26 is inserted into cavity 25 to extend below the fourth ledge 30, but above the bottom 33 of cavity 25. A top cylindrical portion 71 of the orifice plug 26 is located below the first ledge 28 and just above the second ledge 29, the cylindrical portion 71 having a semi-circular notch 41 in its outer circumferential wall. The notch 41 allows the secondary port 36 to communicate with an area of cavity 25 located above the orifice plug 26. A pair of spaced O-rings 39a, 39b are positioned around the outside of the orifice plug 26 to support the orifice plug 26 and directly seal an area of cavity 25 above orifice plug 26 from the inlet channel 32 and the outlet channel 34. O-ring 39a is supported on the third ledge 35 and O-ring 39b is supported on the fourth ledge 30. Therefore, the disc-like top portion 71 of orifice plug 26 rests directly on the second ledge 29 at an outside circumference and on the O-ring 39a within the outside circumference. Likewise, the middle ring of orifice plug 26 rests directly on O-ring 39b on the fourth ledge 30.

In the illustrated example (FIGS. 2–4), the orifice plug 26 has an L-shaped gas flow channel 43 which extends perpendicularly toward and between a pair of axially parallel through-holes 38. The channel 43 has a first end 45 adjacent and substantially parallel with the inlet channel 32, an elbow 37 at the axis of the orifice plug 26, an axially extending portion and a second opening 47 adjacent the bottom 33 of recess 25 and substantially transverse to the inlet channel 32. The channel 43 therefore connects the inlet channel 32 to the outlet channel 34. Moreover, the connecting channel 43 opens into the bottom 33 of the recess 25 at a seat area 40 on the bottom of orifice plug 26. Therefore, the normal fluid path of a pressurized fluid through the pressure regulator 10 starts with the fluid entering the inlet port 22 and flowing into the inlet channel 32. The pressurized fluid then passes laterally into the connecting channel 43 of the orifice plug 26, takes a turn at the elbow 37 and exits the orifice plug 26 in an axial direction at seat 40 into the bottom 33 of the orifice plug cavity 25. The pressurized fluid will then finally exit the pressure regulator 10 in a lateral direction through the outlet channel 34 and the outlet port 24.

Figure 6:
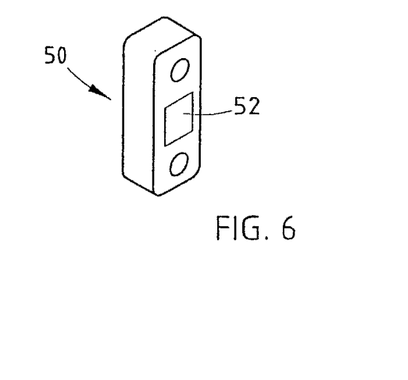
FIG. 6 is an isometric view of the disc holder in accordance with the present invention.

In the illustrated preferred embodiment, a yoke assembly 42 (FIG. 4) is integrally assembled with the orifice plug 26 and extends through the two substantially parallel through-holes 38. The yoke assembly 42 includes a head 44, a thrust washer 46, two spaced suspension arms 48 and a disc holder 50. The disc holder 50 (FIG. 6) is a substantially rectangular bar that includes a valve disc 52 located in a recess in the top of the disc holder 50. The disc holder 50 and disc 52 are located adjacent to the bottom face of orifice plug 26. As described in more detail below, the disc 52 is configured to come into contact with seat 40 to prevent and/or restrict gas flow through the pressure regulator 10 depending upon the variable spacing therebetween. The disc 52 is preferably somewhat resilient and made of a synthetic rubber. The two suspension arms 48 extend slidably through the two substantially parallel through-holes 38 of orifice plug 26 and are attached to the disc holder 50 on opposite sides of the disc recess in the disc holder 50. The two suspension arms 48 preferably have a diameter of about 0.1 inch and are secured to the disc holder 50 by ultrasonic welding or other such means (including fasteners). The yoke washer 46 is attached to the two suspension arms 48 on their ends opposite the disc holder 50. The yoke assembly 42 is thereby movably connected to the orifice plug 26, with the orifice plug 26 between the yoke washer 46 and the disc holder 50. The yoke head 44 is a cylinder attached coaxially to the top of the yoke washer 46 on a planar face thereof opposite the two suspension arms 48. The head 44, the thrust washer 46 and the two spaced suspension arms 48 of the yoke assembly 42 are preferably integrally formed.

The illustrated yoke assembly 42 moves linearly in the axial direction by sliding movement of the suspension arms 48 through the two substantially parallel through-holes 38 in the orifice plug 26. An O-ring 49 surrounds each of the suspension arms 48 in each of the two substantially parallel through-holes 38. The O-rings 49 are stationary within the orifice plug 26 and seal a fluid path through the two substantially parallel through-holes 38. The O-rings 49 also provide friction on the yoke assembly 42 as the yoke assembly 42 cycles up and down. The O-rings 49 therefore create a damping effect to contain the possibility of harmonic motion of the yoke assembly 42 within the orifice plug 26. The yoke assembly 42 may have a vertical movement distance 77 of about 0.020 inches to 0.050 inches. Most preferably, the yoke assembly 42 has a vertical movement distance of 0.030 inches. When the yoke assembly 42 is at the top of its allowable movement, the disc 52 in the disc holder 50 covers the flow orifice and seat 40 and stops all flow through the connecting channel 43, and therefore, through the pressure regulator 10. When the yoke assembly 42 is at the bottom of its stroke, the flow orifice/seat 40 is uncovered and open, whereby gas or other fluids can flow freely through the pressure regulator 10. Preferably, the orifice plug 26 and the yoke assembly 42 are made of plastic. Most preferably, the orifice plug 26 is made of a polyester polymer and the yoke assembly 42 is made of an acetyl polymer.

In the illustrated example, the pressure regulator 10 has an elastic diaphragm 56 connected to the yoke assembly 42.

Figure 5:
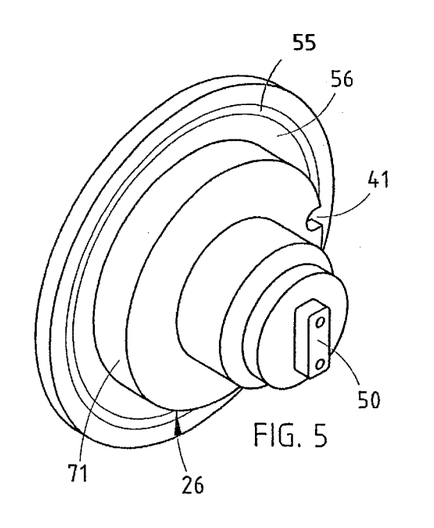
FIG. 5 is an isometric view of the orifice plug, disc holder and elastic diaphragm in accordance with the present invention.

The elastic diaphragm 56 is configured as a washer with top and bottom planar faces with an axial hole that receives the yoke head 44 of the yoke assembly 42. Moreover, the outer circumference of the elastic diaphragm 56 is supported on the first ledge 28 of the orifice plug cavity 25 in the lower body 14. The elastic diaphragm 56 also has a downwardly depending tongue 55 that fits with a circular groove 57 on the first ledge 28 of the cavity 25 in order to properly align and support the elastic diaphragm 56. The cavity 25 therefore has an open cylindrical area that is located below the elastic diaphragm 56 and above the orifice plug 26. A pressure plate 58 is also attached to the yoke assembly 42. The pressure plate 58 is located within a circular cavity 61 (FIG. 2) in the upper body 12 and has an axial opening that receives the yoke head 44. The pressure plate 58 is joined to the elastic diaphragm 56 and the yoke assembly 42 by a retaining nut 66 which engages the outside of the yoke head 44, thereby clamping the elastic diaphragm 56 between the pressure plate 58 and washer 46 and fastening these components to yoke assembly 42 as an operating unit.

The illustrated adjustment cap 20 of the pressure regulator 10 includes a circular adjustment collar 94 attached to the bottom of the top portion 21 of the cap 20 and located within the circular cavity 61 of the upper body 12. The adjustment collar 94 has an open annular tube 96 that extends out of the opening 59 in the top of the upper body 12. The bottom of the top portion 21 of the cap 20 is attached to the top of the open annular tube 96. The open annular tube 96 also has an L-shaped leg 98 extending from the side of the open annular tube 96. The annular leg 98 has a first portion 101 extending transversely of the outside wall of the cylindrical body 88 and a downward depending annular second portion 103 that is substantially perpendicular to the first portion 101 of the leg 98. Therefore, a recess 104 is located within the adjustment collar 94 between the annular second portion 103 of the L-shaped leg 98 and the open annular tube 96 of the adjustment collar 94, but below the first portion 101 of the L-shaped leg 98. The illustrated outside periphery of first portion 101 of the leg 98 has an O-ring 120 in a recess adjacent the inside wall 99 of the circular cavity 61 in order to seal the circular cavity 61 from the contaminants. The second portion 103 of the leg 98 has outside threads 100 that mate with inside threads 102 of the inside wall 99 of the circular cavity 61 of the upper body 12a. As explained in more detail below, rotating the cap 20 will force the adjustment collar 94 down to positively open the pressure regulator 10.

In the illustrated example, the pressure regulator 10 has a large spring 64 that extends upwardly into the recess 104 of the adjustment collar 94, to the top of the latter. An upper washer 62 is located at the top of the large spring 64 and the plate 58 is located at the bottom of the large spring 106 thereby allowing the large spring 106 to compress within the upper body 12. A lower washer 110 is located directly above the plate 58a of the yoke assembly 42a and the elastic diaphragm 56a. The illustrated large spring 64 operates to positively open the pressure regulator 10 by pressing down on the plate 58 and thus on diaphragm 56. Therefore, the cap 20 is connected to the valve disc 52 through the spring 64, the pressure plate 58, the nut 66, the elastic diaphragm 56, the orifice plug 26 and the yoke assembly 42.

The illustrated pressure regulator 10 is constructed by first assembling the yoke assembly 42 and the orifice plug 26 into an operative component. The elastic diaphragm 56 and the plate 58 are then connected to the yoke assembly 42 and the orifice plug 26 with the retaining nut 66. The O-rings 39a, 39b are then placed around the orifice plug 26 and the orifice plug 26 and O-rings 39 are inserted into the cavity 25. The orifice plug 26 is therefore situated on the second ledge 29 and the third ledge 30, and the flexible diaphragm 56 is then situated on the first ledge 28. The spring 64 is then placed on the pressure plate 58 within the circular cavity 61. This assembles the yoke assembly 42, the upper body 12, the cap 20, the plate 58, the elastic diaphragm 56 and the orifice plug 26 together. The upper body 12 and the lower body 14 are secured together by crimping the upstanding flange on the outside of the upper portion 13 of the lower body 14 over the outer flange 16 of the upper body 12. The elastic diaphragm 56 is held in place around its circumference by a downwardly depending flange 68 located on the inside of the outer flange 16 of the upper body 12 which clamps the diaphragm against first ledge 28, thereby leaving an open space in the orifice plug cavity 25 between the bottom face of the elastic diaphragm 56 and the top of the orifice plug 26. This space provides the pressure-regulating chamber.

In the illustrated example, the pressure regulator 10 will regulate the fluid pressure to the outlet port 24 by allowing fluid to flow through the inlet port 22 and into the inlet channel 32. The fluid then passes into the connecting channel 43 of the orifice plug 26 and exits the orifice plug 26 at the orifice 40 into the bottom 33 of the orifice plug cavity 25. The fluid will then finally exit out of the pressure regulator 10 through the outlet channel 34 and the outlet port 24. The fluid in the outlet port 24 will also enter the orifice plug cavity 25 through the secondary port 36 and the notch 41 in the orifice plug 26. The fluid in the orifice plug cavity 25 from the secondary port 36 will enter the orifice plug cavity 25 above the orifice plug 26 and below the elastic diaphragm 56, and will apply a pressure to the elastic diaphragm 56 which, when balanced against the spring force applied to the top of the diaphragm, determines the pressure in the outlet port 24. In a steady state condition, the elastic diaphragm 56 will keep the disc 52 sufficiently away from the orifice 40 to allow fluid to flow at a near constant pressure through the pressure regulator. However, if the pressure of the fluid at the outlet port 24 rises, it will force the elastic diaphragm 56 and the spring 64 in the circular cavity 61 upward. When the elastic diaphragm 56 is forced upwards, the yoke assembly 42 and disc holder 50 will move upward and force the disc 52 into contact with the orifice 40, thereby decreasing the flow of fluid to the outlet port 24. When the pressure in the outlet port 24 and the orifice plug cavity 25 below the elastic diaphragm 56 is reduced, the elastic diaphragm 56 under the force of the spring 64 above it will move downward, thereby lowering the yoke assembly 42, including disc holder 50 and disc 52. Fluid will then again flow through the pressure regulator 10. When the adjustment screw 20 is rotated to move downward towards the top of the upper body 12, the attached adjustment collar 94 will also rotate downward. The downward movement of the adjustment screw 20 and the adjustment collar 94 will thereby compress the large spring 64 between the first portion 101 of the L-shaped leg 98 and the plate 58. Since the adjustment collar 84 captures the large spring 64 at its top end, the large spring 64 is forced to compress downwardly against the plate 58 connected to the yoke assembly 42. The large spring 64 will therefore create a downward force against the top of the plate 58 of the yoke assembly 42 as the large spring 64 is compressed. If the large spring 64 is compressed beyond a predetermined point, the large spring 64 will force the annular flange 46 to move downward. The compression of the large spring 64 will therefore force the yoke assembly 42 downward. Therefore, rotating the adjustment screw 20 to move it downward will force the large spring 64 and yoke assembly 42 downward due to compression of the large spring 64. Consequently, the disc 52 will move away from the plug face 40, thereby opening the pressure regulator 10. Hence, rotating the adjustment screw 20 to move it downward will increase the pressure regulator 10 outlet flow.

Every time the adjustment screw 20 is rotated downward, a new steady-state condition is created for the pressure regulator 10, whereby the disc 52 is located a further distance from the bottom face and orifice 40 of the orifice plug 26, thereby allowing more fluid to pass through the pressure regulator 10. As discussed previously, however, if the pressure of the fluid leaving the outlet port 24 rises above the downward force of the large spring 106 in each such steady state condition, the fluid pressure in the outlet port 24 and in the orifice plug cavity 25 below the elastic diaphragm 56 and above the orifice plug 26 will force the elastic diaphragm 56 upwards. When the elastic diaphragm 56 is forced upwards, the attached yoke assembly 42 and disc holder 50 will move upwards and force the disc 52 toward the orifice 40, thereby decreasing the flow of fluid into the outlet port 24. When the pressure in the outlet port 24 and the cavity 25 below the elastic diaphragm 56 decreases to a desired level, the large spring 64 will move the elastic diaphragm 56 lower, thereby lowering the yoke assembly 42, disc holder 50 and disc 52. Fluid flow will then increase through the pressure regulator 10.

The reference number 10a (FIG. 7) generally designates a second embodiment of the present invention, comprising a pressure regulator having additional features. Pressure regulator 10a is essentially similar to the previously described pressure regulator 10 in many ways, similar parts appearing in FIG. 1 and FIG. 7 respectfully are represented by the same, corresponding reference numeral, except for the suffix "a" in the numerals of the latter. The lower body 14a, cap 20, the orifice plug 26a, the yoke assembly 42a and the elastic diaphragm 56a are configured and function substantially the same in both the first and the second embodiments of the present invention. The yoke assembly 42a, however, of the illustrated pressure regulator 10a of the second embodiment has an opening and closing cylinder 86 replacing the head 44 of the pressure regulator 10 of the first embodiment. The opening and closing cylinder 86 includes a cylindrical body 88, and a smaller diameter pin 92 that extends from the top of the cylindrical body 88. The cylindrical body 88 of the opening and closing cylinder 86 extends upward from the pressure plate 58a to an area adjacent the top of the upper body 12a.

Figure 7:
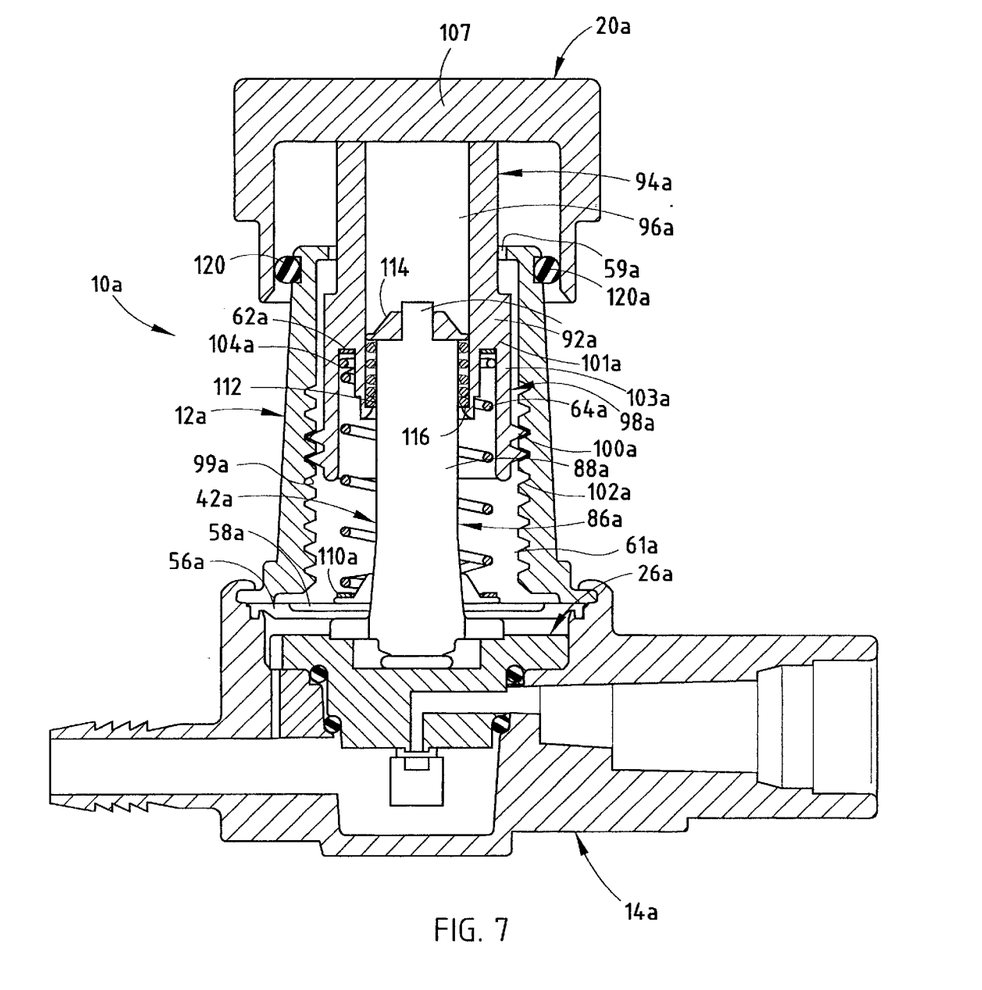
FIG. 7 is a cross-sectional view of the pressure regulator according to a second embodiment of the present invention.

The illustrated pressure regulator 10a also has a shut-off spring 112 that is located within the open tube 96a that surrounds the top portion of the cylindrical body 88 of the opening and closing cylinder 86. The shut-off spring 112 is located between a collar 114 attached to the smaller diameter pin 92 at the top of the opening and closing cylinder 86 and an integral flange 116 located at the bottom of the open annular tube 96a. The illustrated shut-off spring 112 operates to positively close the pressure regulator 10a by pressing upwardly on the collar 114 and, thus, on the opening and closing cylinder 86.

When the cap 20a is rotated to move away from the top of the upper body 12a, the adjustment collar 94a will likewise rotate upward. The upward movement of the cap 20a and the adjustment collar 94a will compress the shut-off spring 112 between the collar 114 and the flange 116. The upward movement of adjustment collar 94a decompresses spring 64a, while compressing the shut-off spring 112 against the stop 114 on pin 92 of the opening and closing cylinder 86. The shut-off spring 112 will therefore create an upward force against the top of the stop collar 114 and the attached opening and closing cylinder 86. If the shut-off spring 112 is compressed beyond a predetermined point, the shut-off spring 112 will force the opening and closing cylinder 86 to move upward. Therefore, rotating the cap 20a upward will force the pin 114 and the opening and closing cylinder 86 upward. Consequently, the disc 52a will move towards the orifice 40a, closing the pressure regulator 10a. Hence, rotating the cap 20a upward will positively close the pressure regulator 10a. Therefore, the pressure regulator 10a of the second embodiment can be positively shut off to the flow of fluid through the plug 26a without any gas pressure under the elastic diaphragm 56a.

The pressure regulator of the present invention provides a simplified and very compact design that can be incorporated into various regulator designs with slight modifications and should not be considered only unique to the disclosed design. It should be noted that in the event there is no downstream demand, gas pressure increases inside the chamber until the seat disk forms a seal on the valve seat, causing a zero flow or lockup condition. In this regard, the described invention also includes a safety feature commonly referred to as pressure control.

As described previously, the mechanism of this device operates to control output flow pressure to meet downstream demand. When demand increases, outlet pressure decreases and this results in downward movement of the diaphragm and its related parts, including the yoke assembly, causing the seat disk to move incrementally away from the orifice and thereby allow more flow through the device to supply the new demand at the same regulated pressure. This continues until the demand is satisfied and an equilibrium state is reached. Conversely, the same events occur in reverse for conditions of decreasing demand. Changes in inlet pressure and/or demand will cause the device to compensate by opening or closing the valve mechanism in response to and in accordance with the new conditions, to again reach an equilibrium state.

The described invention provides consistent repeatable performance over a wide range of inlet pressures and flow rates while also enabling significant reduction in orifice diameter and in diaphragm and overall regulator size. Furthermore, it accomplishes this by use of a simplified mechanism that is less expensive to manufacture and assemble, while at the same time providing better operating results due to the novel design, which substantially reduces function and regulating inaccuracies due to mechanical tolerance variations and lost motion inherent in less directly acting mechanisms which characterize the prior art.

The foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. Therefore, it is to be understood that the embodiment shown in the drawings and described above is provided principally for illustrative purposes and should not be used to limit the scope of the invention, which is defined by the following claims as interpreted according to the principles of patent law, including the doctrine of equivalents.

It will be readily appreciated by those skilled in the art that modifications may be made to the invention without departing from the concepts disclosed herein. Such modifications are to be considered as included in the following claims, unless these claims by their language expressly state otherwise.

We claim:

1. A pressure regulator comprising:
   a housing having a bore, the housing including an inlet port and an outlet port fluidly connected to the bore;
   a plug located within the housing and dividing the bore into an upper chamber and a lower chamber, the plug including a channel fluidly connected to the inlet port, the channel including a valve seat fluidly connecting the inlet port to the bore;
   a yoke extending through the plug and being adapted to move relative to the plug, the yoke being connected to a valve, the valve being adapted to selectively cover the valve seat;
   a diaphragm located in the upper chamber, the diaphragm being connected to the yoke;
   a vent fluidly connecting the upper chamber to the lower chamber; and
   a biasing member biasing the yoke through the plug such that the valve does not cover the valve seat; and
   wherein the diaphragm is configured to move against the biasing member when pressure in the lower chamber is above a predetermined amount, thereby forcing the yoke to slide within the plug and the valve to cover the valve seat such that fluid is not able to pass through the inlet port of the housing and the channel of the plug.

2. The pressure regulator of claim 1, wherein:
   the housing includes a lower housing member and an upper housing member;
   the plug is located within the lower housing member; and
   a periphery of the diaphragm is located between the upper housing member and the lower housing member.

3. The pressure regulator of claim 2, wherein:
   the lower housing member includes a plurality of ledges;
   the plug includes a plurality of projections;
   at least one of the projections of the plug is located on one of the ledges of the lower housing member.

4. The pressure regulator of claim 3, wherein:
   at least one O-ring is located between one of the ledges of the lower housing member and one of the projections of the plug.

5. The pressure regulator of claim 4, wherein:
   the vent extends through the lower housing member and one of the projections of the plug, thereby fluidly connecting the lower chamber to the upper chamber.

6. The pressure regulator of claim 1, wherein:
   the plug includes a pair of parallel through holes;
   the yoke includes a pair of parallel legs extending through the through holes of the plug, the yoke further includes a valve holder extending between the legs adjacent the valve seat; and
   the valve includes a disc connected to the valve holder of the yoke.

7. The pressure regulator of claim 6, further including:
   an O-ring surrounding each of the pair of parallel legs of the yoke;
   wherein each of the O-rings abuts against an inside wall of the through holes of the plug.

8. The pressure regulator of claim 1, further including:
   a cap connected to the housing, the cap enclosing the bore to define an internal cavity between the housing and the cap.

9. The pressure regulator of claim 8, wherein:
   the cap is rotatably connected to the housing.

10. The pressure regulator of claim 9, wherein:
    the cap includes an adjustment collar adapted to engage the biasing member;
    the biasing member is located between the cap and the diaphragm;
    rotation of the cap causes the cap to be alternatively moved towards and away from the diaphragm; and
    rotation of the cap towards the biasing member increases the predetermined amount and rotation of the cap away from the biasing member reduces the predetermined amount.

11. The pressure regulator of claim 9, wherein:
    the biasing member comprises a first spring applying a first force to the yoke to bias the valve away from the valve seat;
    further including a second spring applying a second force to the yoke to bias the valve towards the valve seat;
    wherein rotation of the cap away from the diaphragm can cause the valve to abut the valve seat to positively stop fluid flow through the plug.

12. The pressure regulator of claim 11, wherein:
    the second spring is located between the adjustment collar and the yoke.

13. A pressure regulator comprising:
    a housing having a bore therein, the housing including an inlet port and an outlet port opening into the bore;
    a cap rotatably connected to the housing, the cap closing the bore to define an internal cavity between the housing and the cap;
    a plug located within the housing, the plug including a channel fluidly connected to the inlet port, the channel including a valve seat fluidly connecting the inlet port to the bore;
    a yoke adapted to move relative to the plug, the yoke having a first end and a second end, with the plug being located between the first end of the yoke and the second end of the yoke, the yoke including a valve at the second end thereof, the second end of the yoke being adapted to move the valve towards the valve seat to cover the valve seat and thereby stop fluid flow through the plug, the second end of the yoke further being adapted to move the valve away from the valve seat to thereby open fluid flow through the plug;
    a diaphragm located in the upper chamber, the diaphragm being connected to the yoke between the first end of the yoke and the second end of the yoke, the diaphragm also being located between the first end of the yoke and the plug;
    a first spring located between the cap and the diaphragm, the first spring biasing the diaphragm towards the plug, thereby biasing the first end of the yoke towards the plug and the second end of the yoke away from the plug, thereby moving the valve away from the valve seat to allow fluid flow through the plug; and
    a second spring located between the cap and the yoke, the second spring biasing the first end of the yoke away from the plug, thereby moving the valve towards the valve seat to stop the fluid flow through the plug;
    wherein the cap can be alternatively rotated towards and away from the diaphragm and the plug;
    wherein rotating the cap towards the diaphragm and the plug applies a greater bias to the diaphragm through the first spring to force the valve away from the valve seat and allow the fluid flow through the plug; and wherein rotating the cap away from the diaphragm and the plug applies a greater bias to the yoke through the second spring to force the valve against the valve seat and positively shut off fluid flow through the plug.

14. The pressure regulator of claim 13, wherein:

the yoke extends through the plug.

15. The pressure regulator of claim 14, further including:

a vent fluidly connecting the upper chamber to the lower chamber;

wherein the diaphragm is configured to move against the first spring when pressure in the lower chamber and vented to the upper chamber through the vent is above a predetermined amount, thereby forcing the yoke to slide within the plug and the valve to cover the valve seat such that fluid is not able to pass though the inlet port of the housing and the channel of the plug.

16. The pressure regulator of claim 15, wherein:

the housing includes a lower housing member and an upper housing member;

the plug is located within the lower housing member; and a periphery of the diaphragm is located between the upper housing member and the lower housing member.

17. The pressure regulator of claim 16, wherein:

the lower housing member includes a plurality of ledges;

the plug includes a plurality of projections;

at least one of the projections of the plug is located on one of the ledges of the lower housing member.

18. The pressure regulator of claim 17, wherein:

at least one O-ring is located between one of the ledges of the lower housing member and one of the projections of the plug.

19. The pressure regulator of claim 18, wherein:

the vent extends through the lower housing member and one of the projections of the plug, thereby fluidly connecting the lower chamber to the upper chamber.

20. The pressure regulator of claim 13, wherein:

the plug includes a pair of parallel through holes;

the yoke includes a pair of parallel legs extending through the through holes of the plug, the yoke further includes a valve holder extending between the legs adjacent the valve seat; and the valve includes a disc connected to the valve holder of the yoke.

21. The pressure regulator of claim 20, further including:

an O-ring surrounding each of the pair of parallel legs of the yoke;

wherein each of the O-rings abuts against an inside wall of the through holes of the plug.

22. The pressure regulator of claim 13, wherein:

the cap includes an adjustment collar adapted to engage the first spring; and the first spring is located between the adjustment collar and the diaphragm.

23. The pressure regulator of claim 22, wherein:

the second spring is located between the adjustment collar and the yoke.

24. A pressure regulator comprising:

a housing having a bore therein, the housing including an inlet port, the housing further including an outlet port opening into the bore;

a cap rotatably connected to the housing, the cap enclosing the bore to define an internal cavity between the housing and the cap;

a plug located within the internal cavity, the plug including a channel fluidly connected to the inlet port, the channel including a valve seat fluidly connecting the inlet port to the bore and thereby to the outlet port;

a yoke adapted to move relative to the plug and including a valve, the yoke being adapted to move the valve towards the valve seat to cover the valve seat and thereby stop fluid flow through the plug, the yoke further being adapted to move the valve away from the valve seat to thereby open fluid flow through the plug;

a first biasing member applying a first force to the yoke to bias the valve away from the valve seat; and a second biasing member applying a second force to the yoke to bias the valve towards the valve seat;

wherein rotation of the cap alternatively increases the first force to increase the bias of the valve away from the valve seat and increases the second force to increase the bias of the valve towards the valve seat.

25. The pressure regulator of claim 24, wherein:

the yoke extends through the plug.

26. The pressure regulator of claim 25, further including:

a vent fluidly connecting the upper chamber to the lower chamber;

wherein the diaphragm is configured to move against the first spring when pressure in the lower chamber and vented to the upper chamber through the vent is above a predetermined amount, thereby forcing the yoke to slide within the plug and the valve to cover the valve seat such that fluid is not able to pass through the inlet port of the housing and the channel of the plug.

27. The pressure regulator of claim 26, wherein:

the housing includes a lower housing member and an upper housing member;

the plug is located within the lower housing member; and a periphery of the diaphragm is located between the upper housing member and the lower housing member.

28. The pressure regulator of claim 27, wherein:

the lower housing member includes a plurality of ledges;

the plug includes a plurality of projections;

at least one of the projections of the plug is located on one of the ledges of the lower housing member.

29. The pressure regulator of claim 28, wherein:

at least one O-ring is located between one of the ledges of the lower housing member and one of the projections of the plug.

30. The pressure regulator of claim 29, wherein:

the vent extends through the lower housing member and one of the projections of the plug, thereby fluidly connecting the lower chamber to the upper chamber.

31. The pressure regulator of claim 24, wherein:

the plug includes a pair of parallel through holes;

the yoke includes a pair of parallel legs extending through the through holes of the plug, the yoke further includes a valve holder extending between the legs adjacent the valve seat; and the valve includes a disc connected to the valve holder of the yoke.

32. The pressure regulator of claim 31, further including:

an O-ring surrounding each of the pair of parallel legs of the yoke;

wherein each of the O-rings abuts against an inside wall of the through holes of the plug.

33. The pressure regulator of claim 24, wherein:

the cap includes an adjustment collar adapted to engage the first biasing member; and the first biasing member is located between the adjustment collar and the diaphragm.

34. The pressure regulator of claim 33, wherein:

the second biasing member is located between the adjustment collar and the yoke.

35. A pressure regulator comprising:

a housing having a bore, the housing including an inlet port and an outlet port fluidly connected to the bore;

a plug located within the housing and dividing the bore into an upper chamber and a lower chamber, the plug including a channel fluidly connected to the inlet port, the channel including a valve seat fluidly connecting the inlet port to the bore;

a yoke extending through the plug and being adapted to move relative to the plug, the yoke being connected to a valve, the valve being adapted to selectively cover the valve seat;

a diaphragm located in the upper chamber;

a vent fluidly connecting the upper chamber to the lower chamber; and a biasing member configured to bias the yoke through the plug such that the valve does not cover the valve seat; and wherein the diaphragm is configured to move against the biasing member when pressure in the lower chamber is above a predetermined amount, thereby allowing the yoke to slide within the plug and the valve to cover the valve seat such that fluid is not able to pass though the inlet port of the housing and the channel of the plug; and wherein a fluid path is defined between the valve seat and the outlet port, and the vent is located in the fluid path between the valve seat and the outlet port.

36. The pressure regulator of claim 35, wherein:

the housing includes a lower housing member and an upper housing member;

the plug is located within the lower housing member; and a periphery of the diaphragm is located between the upper housing member and the lower housing member.

37. The pressure regulator of claim 36, wherein:

the lower housing member includes a plurality of ledges;

the plug includes a plurality of projections;

at least one of the projections of the plug is located on one of the ledges of the lower housing member.

38. The pressure regulator of claim 37, wherein:

at least one O-ring is located between one of the ledges of the lower housing member and one of the projections of the plug.

39. The pressure regulator of claim 38, wherein:

the vent extends through the lower housing member and one of the projections of the plug, thereby fluidly connecting the lower chamber to the upper chamber.

40. The pressure regulator of claim 35, wherein:

the plug includes a pair of parallel through holes;

the yoke includes a pair of parallel legs extending through the through holes of the plug, the yoke further includes a valve holder extending between the legs adjacent the valve seat; and the valve includes a disc connected to the valve holder of the yoke.

41. The pressure regulator of claim 40, further including:

an O-ring surrounding each of the pair of parallel legs of the yoke;

wherein each of the O-rings abuts against an inside wall of the through holes of the plug.

42. The pressure regulator of claim 35, further including:

a cap connected to the housing, the cap enclosing the bore to define an internal cavity between the housing and the cap.

43. The pressure regulator of claim 42, wherein:

the cap is rotatably connected to the housing.

44. The pressure regulator of claim 43, wherein:

the cap includes an adjustment collar adapted to engage the biasing member;

the biasing member is located between the cap and the diaphragm;

rotation of the cap causes the cap to be alternatively moved towards and away from the diaphragm; and rotation of the cap towards the biasing member increases the predetermined amount and rotation of the cap away from the biasing member reduces the predetermined amount.

45. The pressure regulator of claim 43, wherein:

the biasing member comprises a first spring applying a first force to the yoke to bias the valve away from the valve seat;

further including a second spring applying a second force to the yoke to bias the valve towards the valve seat;

wherein rotation of the cap away from the diaphragm can cause the valve to abut the valve seat to positively stop fluid flow through the plug.

46. The pressure regulator of claim 45, wherein:

the second spring is located between the adjustment collar and the yoke.

47. The pressure regulator of claim 35, wherein:

the diaphragm is connected to the yoke.

* * * * *